United States Patent [19]
Walker

[11] Patent Number: 5,403,820
[45] Date of Patent: Apr. 4, 1995

[54] ENVIRONMENTALLY SAFE WATER BASE DRILLING FLUID

[75] Inventor: Thad O. Walker, Kingwood, Tex.

[73] Assignee: O'Brien-Goins-Simpson & Associates, Houston, Tex.

[21] Appl. No.: 996,583

[22] Filed: Dec. 24, 1992

[51] Int. Cl.$^6$ ............................................. C09K 7/02
[52] U.S. Cl. .................................................. 507/110
[58] Field of Search ........................................ 507/110

[56] References Cited
FOREIGN PATENT DOCUMENTS
9202594 2/1992 WIPO .

Primary Examiner—Gary Geist
Attorney, Agent, or Firm—Roy F. House

[57] ABSTRACT

The invention provides a water base drilling fluid having decreased swelling effect on hydratable shales contacted by the drilling fluid wherein the aqueous phase contains an alkyl glucoside solubilized therein. Another embodiment of the invention provides an aqueous solution for addition to drilling fluids to decrease the swelling of hydratable shales contacted by the drilling fluid, the solution comprising an aqueous phase having dissolved (solubilized) therein from about 50% to about 85% by weight methyl glucoside and at least about 2% by weight of an alkali metal hydroxide.

13 Claims, No Drawings

ENVIRONMENTALLY SAFE WATER BASE DRILLING FLUID

FIELD OF THE INVENTION

This invention relates to environmentally safe shale-stabilization additives and to aqueous drilling muds containing environmentally safe shale-stabilization additives.

BACKGROUND OF THE INVENTION

During well-drilling operations, formations are often encountered which lose physical and dimensional integrity when exposed to aqueous drilling fluids (muds). In most cases, such formations comprise reactive shales. Prior to the advent of oil-based, emulsion and invert emulsion muds, great difficulty was encountered in drilling these types of shales. On the other hand, while hydrocarbon-containing muds make drilling through reactive shales possible, they pose safety and environmental hazards and can interfere with well-logging operations.

A variety of water-based drilling additives has been developed over the years in an attempt to deal with shale drilling problems effectively while avoiding the problems encountered when oil-based muds were used. Vail et al., in U.S. Pat. No. 2,133,759, disclose muds containing alkali metal silicates. In U.S. Pat. No. 2,146,693, Vietti et al. disclosed a drilling fluid containing one of several sodium salts, including sodium silicate, the sodium salt content of the mud being in excess of 20% by weight. Sawsdon, in U.K. Patent Application 2,089,397A, disclosed an aqueous wellbore fluid for use in drilling, well completion, packing, perforating or workover fluid containing at least 20% by weight of potassium carbonate; optionally a water-soluble polymeric viscosifier, such as carboxymethylcellulose, was added to the wellbore fluid. Gray et al., in "Composition and Properties of Oil Well Drilling Fluid", 4th Edition (Gulf Publishing Company 1980), reported the use of potassium salts in drilling fluids to suppress the swelling of bentonite, potassium chloride being preferred. Another standard industry reference that describe the shale stabilizing effect of the potassium ion in polymer muds may be found in SPE 10100 "Fundamentals and Use of Potassium/Polymer Drilling Fluids to Minimize Drilling and Completion Problems Associated with Hydratable Clays," by R. P. Steiger, presented at the 56th Annual Fall Technical Conference, Dallas, Tex., Oct. 5-7, 1981. U.S. Pat. No. 4,447,341, to Block relates to a drilling fluid containing A10(OH) and a crosslinked polyvinyl alcohol together with a potassium salt, such as potassium chloride, as a clay-stabilizing composition. Coffey et al., in the Oil & Gas Journal, Jan. 27, 1987, described shale inhibition using an aqueous system, maintained at a pH of 9.0 or less, which contains an unidentified nonionic polymer combined with potassium phosphate complex of undefined composition. Peterson in U.S. Pat. No. 4,780,220 discloses the use of glycerin, polyglycerin, and mixtures thereof in a drilling mud to inhibit the swelling of clays.

The current technology of choice for aqueous-based shale-stabilizing muds involves the use of partially hydrolyzed polyacrylamide (PHPA) combined with potassium chloride. Scheuerman disclosed such a combination in U.S. Pat. No. 3,738,437 as part of a regimen for dealing with shale-drilling problems. Systems involving PHPA in combination with various electrolytes, including potassium chloride, at pH of 8.5 to 10.0, were also reviewed by Clark et al. in SPE/IADC 10681, presented at the Mar. 15-18, 1987 SPE/IADC Drilling Conference in New Orleans, La.

Cannon U.S. Pat. Nos. 2,109,858 and 2,191,312 generally disclose the addition of various polyhydroxy compounds, which includes certain carbohydrates such as sucrose, and an alkaline material, such as caustic soda, in aqueous drilling fluids for purposes of inhibiting shale swelling.

Fuller U.S. Pat. No. 2,713,029 discloses the addition to a drilling mud of water soluble carbohydrate mixtures obtained by thermal hydrolysis of lignocellulose at elevated temperatures and pressures. The mixtures are used in amounts within the range from about 0.02% to about 0.5% by volume to impart desirable low viscosities and gel strengths to the drilling mud.

Salathiel U.S. Pat. No. 2,785,125 discloses a water base drilling fluid containing 1-15 ppb starch and 0.5-10 ppb of a water soluble heat degradation product of a saccharide containing 1 to 4 sugar units. The starch and degradation product combine to reduce the fluid loss of the drilling fluid. Salathiel U.S. Pat. No. 2,786,027 discloses a water base drilling fluid containing 1-15 ppb starch and 0.5-5 ppb of an additive having an average molecular weight of about 90 to 3000 and a ratio of carbon to oxygen of 1.5 to 2.7. The starch and additive combine to reduce the fluid loss of the drilling fluid. Walker U.S. Pat. No. 3,849,317 discloses a water base drilling fluid having a liquid phase saturated with calcium hydroxide containing as an additive for reducing gel strength and yield point, from $\frac{1}{8}$ to 8 ppb of hydrolyzed cereal solids which is comprised of from about 15% to about 25% di-saccharides, tri-saccharides, tetrasaccharides, and penta-saccharides, and from 75% to 85% hexa-saccharides and above. Penicone et al. U.S. Pat. No. 4,941,981 discloses a drilling fluid for shale inhibition comprising a liquid phase containing: (a) a water phase comprising fresh water, sea water, brine, simulated brine, or mixtures thereof; and (b) a water-soluble component selected from the class consisting of polyhydric alcohols, glycol, glycol ethers, polypropylene glycols, polyethylene glycols, ethylene oxide-propylene oxide copolymers ("EO-PO"), alcohol-initiated EO-PO copolymers and/or mixtures thereof, the concentration of said water-soluble component in the total liquid phase being from about 5% to about 50% by volume.

Sheu et al. U.S. Pat. No. 5,110,484 discloses aqueous drilling fluids containing the browning reaction product of a carbohydrate, such as pentose, hexose such as fructose and glucose, as well as di- and poly saccharides, such as sucrose, lactose, mannose, cellulose, starch, dextrin, dextran, carboxymethylcellulose, rice and derivatives of such carbohydrates. The preferred carbohydrate is molasses which contains a substantial amount of numerous non-reducing sugars, identified primarily as sucrose, which is inverted to fructose and glucose prior to undergoing the browning reaction.

While the systems developed thus far show improvement over the older water-based mud technology, they are sometimes inadequate when difficult shale formations are encountered and when operating at high formation temperatures. Operators are, therefore, forced to revert to hydrocarbon-containing fluids. It is desirable to provide improved additives for water-based muds that would minimize or completely avoid the need for oil-based systems when drilling problem shale formations.

Thus it is an object of this invention to provide a water base drilling fluid which is environmentally safe and which inhibits the swelling of shale. It is another object of this invention to provide a water base drilling fluid which contains an additive obtained from renewable farinaceous materials in sufficient quantity to decrease the activity of the aqueous phase thus inhibiting the swelling of shales contacted by the drilling fluid.

It is still another object of the invention to provide an additive for water base drilling fluids which decreases the aqueous activity of the drilling fluid and decreases the swelling of shales contacted by the drilling fluid.

These and other objects of the invention will be readily apparent to one skilled in the art as the description thereof proceeds.

SUMMARY OF THE INVENTION

The present invention is based on the discovery that an alkyl glucoside can be added to the aqueous phase of a water base drilling fluid to decrease the activity thereof, and thus to inhibit the swelling of shales contacted by the drilling fluid. The alkyl glucoside, which may be in the α-form, β-form, or a mixture thereof, is less susceptible to hydrolysis than is the glucose from which it is obtained, and hence the drilling fluid has enhanced thermal stability as compared to drilling fluids containing glucose. The preferred alkyl glucoside is methyl glucoside.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS OF THE INVENTION

The drilling fluid of the present invention contains an aqueous phase which may be either fresh water, a brine, sea water, or any combination thereof, having solubilized therein an alkyl glucoside in an amount sufficient to inhibit the swelling of shales contacted by the drilling fluid. The brine, if used, may be a naturally occurring brine or a manufactured brine obtained by the dissolution of one or more water soluble salts in water, a brine, sea water, or mixtures thereof. Suitable water soluble salts include sodium chloride, potassium chloride, calcium chloride, sodium acetate, potassium acetate, calcium acetate, and the like, and mixtures thereof.

Alkyl glucosides are members of the class of compounds known generically as glycosides. The term glycoside is applied to a type of compound in which a sugar is combined through its reducing group with an organic substance such as a phenol or an alcohol. Many of the known glycosides occur naturally in plants and animals and were originally isolated from such sources. Some of these naturally occurring glycosides are the familiar and exotic sounding coniferin, salicin, amygdalin, arbutin, hesperidin, quercitrin, indican, delphinin, and chrysanthemin. The sugar portion of most naturally occurring glycosides is glucose and, accordingly, these glycosides are known specifically as glucosides. (Similarly, if the sugar portion is galaclose the glycosides are specifically designed as galactosides). When the non-sugar part of a glycoside (called aglycon) is a phenol or an alcohol, the compound is known, respectively, as an aryl glycoside or an alkyl glycoside. Thus, the combination of phenol with glucose results in the aryl glycoside known as phenyl glucoside. It also follows that the glycoside arising from the combination of methanol and glucose is the alkyl glycoside, methyl glucoside. Reference may be made to the following books for more information on glycosides in general: M. L. Wolfrom and A. Thompson, H. Baumann and W. Pigman, in "The Carbohydrates" (W. Pigman, ed.), Chapters IV and X, Academic Press, New York, 1957; E. F. Armstrong and K. F. Armstrong, "The Glycosides," Longmans, Green, New York, 1931. Information on methyl glucoside, specifically, can be found in the following book: G. N. Bollenback, "Methyl Glucoside," Academic Press, New York, 1958.

Structurally speaking, a glycoside is the compound resulting from the exchange of an organic radical (aryl, alkyl, etc.) for the hydrogen of the hemiacetal hydroxyl group (that attached to carbon( 1 ) in formula I) of a cyclic form of a reducing sugar.

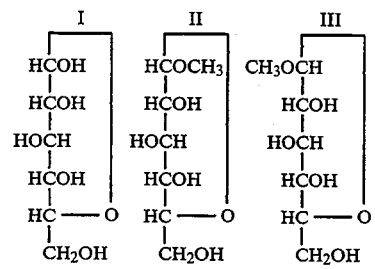

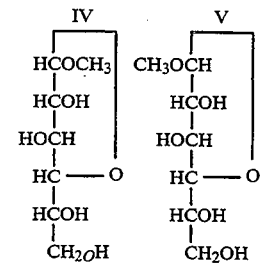

I = D-glucose

II = Methyl α-D-glucopyranoside

III = Methyl β-D-glucopyranoside

IV = Methyl α-D-glucofuranoside

V = Methyl β-D-glucofuranoside

An alkyl glucoside such as a methyl glucoside can exist in several isomeric forms. The carbon atom containing the organic radical (carbon (1)) is asymmetric and the ring structure may shift from 6-membered to 5-membered (pyranose to furanose). Thus, there are at least four different isomers of every glycoside, which are called α- and β- pyranosides (formulas II and III) and α- and β- furanosides (formulas IV and V). For the purposes of this invention, the term alkyl glucoside (or alkyl D-glucoside) is used generically to include all isomeric forms of the alkyl glucoside. The terms alkyl α-D-glucoside and alkyl β-D-glucoside are used when referring to glycosides having the specific α- or β-rotation of the alkyl group. Thus methyl α-D-glucoside includes the isomers methyl α-D-pyranoside and methyl α-D-furanoside, and methyl β-D-glucoside includes the isomers methyl β-D-pyranoside and methyl β-D-furanoside.

The alkyl glucosides for the purposes of this invention are water soluble. Thus the alkyl radical may contain from one to four carbon atoms, i.e., the alkyl radical may be selected from the group consisting of methyl, ethyl, n-propyl, iso-propyl, n-butyl, iso-butyl, sec-butyl, t-butyl, and mixtures thereof. The preferred alkyl radical is methyl or ethyl, most preferably methyl. Thus the preferred glucosides are methyl glucoside and ethyl glucoside, most preferably methyl glucoside.

Methods are known for the preparation of the alkyl glucoside. See for example the following U.S. patents, incorporated herein by reference: U.S. Pat. No. 2,276,621; 2,390,507; 2,606,186; 3,296,245; 3,375,243.

The aqueous phase of the drilling fluid will preferably contain from about 35% to about 65% by weight alkyl glucoside, most preferably from about 45% to about 60%.

The drilling fluids of this invention, in addition to the aqueous phase having solubilized therein an alkyl glucoside as described, will contain other materials known in the drilling fluid an to provide water base drilling fluids with certain desired characteristics. Thus the drilling fluid may contain weighting agents, viscosifiers, fluid loss reducing additives, rheological modifying additives (so-called "thinners") emulsifiers, seepage loss control additives, lubricity additives, defoamers, pH control additives, and the like, including materials known to inhibit shale hydration and/or dispersion, all of such materials being solubilized, suspended, or dispersed in the drilling fluid.

The preferred drilling fluids of this invention contain a hydratable swelling clay such as API grade bentonite. Preferably the swelling clay will be hydrated in fresh water prior to its addition to the drilling fluid or to an aqueous solution of the alkyl glucoside.

The preferred drilling fluids of this invention will contain a basic material to impart a pH of at least about 8.5 to the drilling fluid, preferably a pH from about 9 to about 12. The basic material is preferably sodium hydroxide or potassium hydroxide, most preferably potassium hydroxide. Other bases such as calcium oxide, calcium hydroxide, magnesium oxide, sodium carbonate, and the like may be used in a properly formulated drilling fluid.

As is well known in the art, the drilling fluid is circulated within the borehole while drilling. When the temperature of the subterranean formations contacted by the borehole is greater than the ambient surface temperature, the drilling fluid temperature will increase accordingly. As the temperature increases, reactions within the drilling fluid may occur, depending upon its composition, which decreases the pH of the drilling fluid. Thus periodic additions of a base are required to maintain the desired pH.

In a preferred embodiment of this invention, there is provided an aqueous solution of the alkyl glucoside and the base for addition to the drilling fluid. Thus, I have found that pre-reacting an alkali metal hydroxide and an aqueous solution of the alkyl glucoside provides a liquid additive for use in the preparation and maintenance of drilling fluids which requires that less total alkali metal hydroxide be added to the drilling fluid to maintain the desired pH. The aqueous solution comprises from about 50% to about 85% by weight alkyl glucoside and at least about 2% by weight alkali metal hydroxide. Preferably the aqueous solution comprises from about 55% to about 80% alkyl glucoside and from about 2.5% to about 10% by weight alkali metal hydroxide, most preferably from about 60% to about 80% by weight alkyl glucoside and from about 2.5% to about 5% alkali metal hydroxide.

As indicated hereinbefore, other additives may be added to the drilling fluid of this invention to impart desirable properties thereto. Polyols such as those disclosed in Hale et at. U.S. Pat. No. 5,072,794, incorporated herein by reference, i.e., glycerine, polymerized glycerine, acyclic polyols having at least 3 carbon atoms and at least 2 hydroxyl groups but no more than 80 carbon atoms and 60 hydroxyl groups, and mixtures thereof, may be added to the drilling fluid to provide additional hydratable clay swelling inhibition.

In order to more completely describe the invention, the following non-limiting examples are given. In these examples and throughout this specification, the following abbreviations may be used: API=American Petroleum Institute; cp=centipoise; °F.=degrees Fahrenheit; %=percent; cc=cubic centimeters; cm=centimeter; kg/m$^3$=kilograms per cubic meter; mg/l=milligrams per liter; lb/100 ft$^2$=pounds per 100 square feet; lb/bbl or ppb=pounds per 42 gallon barrel; min.=minute. Unless otherwise indicated the methyl glucoside used in the examples contained from about 45% to about 55% by weight of methyl α-D-glucoside and from about 45% to about 55% by weight of methyl β-D-glucoside. About 94% by weight of the methyl glucoside are the methyl glucopyranoside isomers and about 6% by weight are the methyl glucofuranoside isomers. All drilling fluid data were obtained utilizing the procedures set forth in API Specification RP13B unless otherwise indicated.

EXAMPLE 1

An aqueous methyl glucoside solution was prepared containing 70.0% by weight methyl glucoside and 2.7% by weight potassium hydroxide. 2748 grams of this methyl glucoside solution were mixed with 737 grams of a prehydrated API grade bentonite slurry containing 8.13% by weight bentonite for 30 minutes. Thereafter, 16 grams of DEXTRID ® brand pregelatinized potato starch were added as a fluid loss control additive and the drilling fluid sample mixed an additional 60 minutes. Thus this drilling fluid contained 975.8 kg/m$^3$ of the methyl glucoside solution (683 kg/m$^3$ of methyl glucoside, 26.3 kg/m$^3$ potassium hydroxide), 21.3 kg/m$^3$ bentonite, and 5.7 kg/m$^3$ DEXTRID ®. This drilling fluid sample was split into 350 cc aliquots, and to separate aliquot samples there were added either 28.6 kg/m$^3$ sodium chloride, 57.2 kg/m$^3$ Pierre shale, or 14.3 kg/m$^3$ gypsum. The drilling fluid samples were evaluated for certain properties, as indicated in Tables 1A, 1B, 1C and 1D. Thereafter the samples were hot rolled at 150° F. for 16 hours and certain properties obtained as indicated in Tables 1A, 1B, 1C and 1D. Several samples were additionally static aged in a 325° F. oven for 16 hours and evaluated. The data obtained are set forth in Tables 1C and 1D. The aqueous activities set forth in Tables 1A, 1B, 1C, and 1D were obtained with a Digital Thermo-Hygrometer Model 880 (General Eastern).

TABLE 1A

Base Drilling Fluid

| | Initial | | After Hot Rolling @ 150° F. | |
|---|---|---|---|---|
| Rheology Test Temp., °F. | 75 | 120 | 75 | 120 |
| RPM READINGS | | | | |
| 600 | 238 | 130 | 166 | 75 |
| 300 | 138 | 85 | 87 | 45 |
| 200 | 99 | 69 | 62 | 34 |
| 100 | 56 | 49 | 34 | 22 |
| 6 | 6 | 30 | 3 | 11 |
| 3 | 4 | 28 | 2 | 10 |
| Plastic Viscosity, cp | 100 | 45 | 79 | 30 |
| Yield Point, lb/100 sq ft$^2$ | 38 | 40 | 12 | 15 |
| Initial Gel | 6 | 14 | 2 | 8 |
| 10 min. Gel | 20 | 26 | 21 | 22 |
| pH | 12.1 | | 10.7 | |
| $P_f$ | | | 1.1 | |
| $M_f$ | | | 9.5 | |
| Chloride, mg/l | | | 900 | |
| Calcium, mg/l | | | 320 | |
| API Filtrate, cm$^3$/30 min. | | | 16.9 | |
| Activity | | | 0.82 | |

TABLE 1B

Base Drilling Fluid Plus NaCl

| | Initial | | After Hot Rolling @ 150° F. | |
|---|---|---|---|---|
| Rheology Test Temp., °F. | 75 | 120 | 75 | 120 |
| RPM READINGS | | | | |
| 600 | 182 | 128 | 165 | 94 |
| 300 | 99 | 76 | 88 | 54 |
| 200 | 69 | 58 | 63 | 41 |
| 100 | 36 | 36 | 32 | 27 |
| 6 | 3 | 8 | 3 | 11 |
| 3 | 1 | 6 | 1 | 11 |
| Plastic Viscosity, cp | 83 | 52 | 77 | 40 |
| Yield Point, lb/100 sq ft$^2$ | 16 | 6 | 11 | 14 |
| Initial Gel | 2 | 6 | 3 | 10 |
| 10 min. Gel | 10 | 19 | 22 | 27 |
| pH | 10.7 | | 10.6 | |
| $P_f$ | | | 1.8 | |
| $M_f$ | | | 10.2 | |
| Chloride, mg/l | | | 20000 | |
| Calcium, mg/l | | | 160 | |
| API Filtrate, cm$^3$/30 min. | | | 10.2 | |
| Activity | | | 0.76 | |

TABLE 1C

Base Drilling Fluid Plus Pierre Shale

| | Initial | | After Hot Rolling @ 150° F. | | After Static Aging @ 325° F. | |
|---|---|---|---|---|---|---|
| Rheology Test Temp., °F. | 75 | 120 | 75 | 120 | 75 | 120 |
| RPM READINGS | | | | | | |
| 600 | 160 | 132 | 177 | 104 | 98 | 33 |
| 300 | 85 | 80 | 95 | 64 | 52 | 19 |
| 200 | 60 | 63 | 66 | 50 | 32 | 15 |
| 100 | 31 | 39 | 35 | 33 | 18 | 10 |
| 6 | 3 | 5 | 3 | 16 | 3 | 4 |
| 3 | 1 | 4 | 1 | 16 | 3 | 4 |
| Plastic Viscosity, cp | 75 | 52 | 82 | 40 | 46 | 14 |
| Yield Point, lb/100 sq ft$^2$ | 10 | 28 | 13 | 24 | 6 | 5 |
| Initial Gel | 2 | 4 | 2 | 10 | 3 | 3 |
| 10 min. Gel | 12 | 20 | 14 | 27 | 8 | 6 |
| pH | 12.0 | | 10.7 | | 10.1 | |
| $P_f$ | | | 0.9 | | 0.1 | |
| $M_f$ | | | 9.5 | | 18.0 | |
| Chloride, mg/l | | | 700 | | 800 | |
| Calcium, mg/l | | | 320 | | | |
| API Filtrate, cm$^3$/30 min | | | 15.0 | | | |
| Activity | | | 0.805 | | | |

TABLE 1D

Base Drilling Fluid Plus Gypsum

| | Initial | | After Hot Rolling @ 150° F. | | After Static Aging @ 325° F. | |
|---|---|---|---|---|---|---|
| Rheology Test Temp., °F. | 75 | 120 | 75 | 120 | 75 | 120 |
| RPM READINGS | | | | | | |
| 600 | 162 | 84 | 181 | 78 | 74 | 49 |
| 300 | 86 | 44 | 96 | 41 | 40 | 31 |
| 200 | 59 | 29 | 66 | 37 | 29 | 24 |
| 100 | 30 | 15 | 34 | 14 | 16 | 17 |
| 6 | 2 | 1 | 2 | 1 | 4 | 11 |
| 3 | 1 | 1 | 1 | 1 | 3 | 11 |
| Plastic Viscosity, cp | 76 | 40 | 85 | 37 | 34 | 18 |
| Yield Point, lb/100 sq ft$^2$ | 10 | 4 | 11 | 4 | 6 | 13 |
| Initial Gel | 1 | 1 | 1 | 1 | 6 | 11 |
| 10 min. Gel | 1 | 1 | 2 | 1 | 36 | 22 |
| pH | 11.8 | | 10.9 | | 10.1 | |
| $P_f$ | | | 0.0 | | 0.1 | |
| $M_f$ | | | 3.8 | | 12.5 | |
| Chloride, mg/l | | | 700 | | 1600 | |
| Calcium, mg/l | | | 880 | | 600 | |
| Activity | | | 0.79 | | | |

EXAMPLE 2

A drilling fluid weighted to 1632.7 kg/m$^3$ with API grade barite was prepared, as in Example 1 containing 583.8 kg/m$^3$ methyl glucoside, 22.6 kg/m$^3$ KOH, 18.3 kg/m$^3$ API grade bentonite clay, 5.7 kg/m$^3$ DEXTRID fluid loss control additive, and 586 kg/m$^3$ barite. This base drilling fluid was treated and evaluated as in Example 1. The data obtained are given in Tables 2A, 2B, 2C, and 2D.

TABLE 2A

Base Weighted Drilling Fluid

| | Initial | | After Hot Rolling @ 150° F. | |
|---|---|---|---|---|
| Rheology Test Temp., °F. | 75 | 120 | 75 | 120 |
| RPM READINGS | | | | |
| 600 | — | 184 | 287 | 136 |
| 300 | 170 | 118 | 155 | 81 |
| 200 | 121 | 95 | 108 | 61 |
| 100 | 66 | 68 | 58 | 40 |
| 6 | 6 | 40 | 6 | 18 |
| 3 | 4 | 36 | 4 | 16 |
| Plastic Viscosity, cp | | 66 | 132 | 55 |
| Yield Point, lb/100 sq ft$^2$ | | 52 | 23 | 20 |
| Initial Gel | 6 | 40 | 6 | 24 |
| 10 min. Gel | 15 | 48 | 20 | 28 |
| pH | 12.4 | | 10.8 | |
| $P_f$ | | | 2.2 | |
| $M_f$ | | | 8.8 | |
| Chloride, mg/l | | | 800 | |
| Calcium, mg/l | | | 40 | |
| API Filtrate, cm$^3$/30 min. | | | 16 | |
| Activity | | | 0.81 | |

TABLE 2B

Base Weighted Drilling Fluid Plus 28.6 kg/m³ NaCl

| | Initial | | After Hot Rolling @ 150°F. | |
|---|---|---|---|---|
| Rheology Test Temp., °F. | 75 | 120 | 75 | 120 |
| RPM READINGS | | | | |
| 600 | 300 | 189 | 255 | 143 |
| 300 | 166 | 116 | 137 | 84 |
| 200 | 118 | 90 | 96 | 62 |
| 100 | 63 | 58 | 52 | 39 |
| 6 | 5 | 26 | 9 | 17 |
| 3 | 3 | 25 | 7 | 15 |
| Plastic Viscosity, cp | 134 | 73 | 118 | 59 |
| Yield Point, lb/100 sq ft² | 32 | 43 | 19 | 25 |
| Initial Gel | 3 | 30 | 10 | 25 |
| 10 min. Gel | 30 | 42 | 26 | 38 |
| pH | 11.5 | | 10.2 | |
| $P_f$ | | | 1.0 | |
| $M_f$ | | | 9.4 | |
| Chloride, mg/l | | | 18000 | |
| Calcium, mg/l | | | 80 | |
| API Filtrate, cm³/30 min. | | | 12.9 | |
| Activity | | | 0.78 | |

TABLE 2C

Base Weighted Drilling Fluid Plus 57.2 kg/m³ Pierre Shale

| | Initial | | After Hot Rolling @ 150° F. | |
|---|---|---|---|---|
| Rheology Test Temp., °F. | 75 | 120 | 75 | 120 |
| RPM READINGS | | | | |
| 600 | — | 187 | — | 164 |
| 300 | 170 | 117 | 166 | 100 |
| 200 | 120 | 92 | 117 | 78 |
| 100 | 65 | 61 | 63 | 53 |
| 6 | 6 | 25 | 10 | 25 |
| 3 | 4 | 23 | 8 | 24 |
| Plastic Viscosity, cp | | 47 | | 64 |
| Yield Point, lb/100 sq ft² | | 33 | | 26 |
| Initial Gel | 5 | 18 | 11 | 32 |
| 10 min. Gel | 20 | 47 | 28 | 45 |
| pH | 11.8 | | 10.4 | |
| $P_f$ | | | 1.2 | |
| $M_f$ | | | 9.2 | |
| Chloride, mg/l | | | 800 | |
| Calcium, mg/l | | | 40 | |
| API Filtrate, cm³/30 min. | | | 16.6 | |
| Activity | | | 0.81 | |

TABLE 2D

Base Weighted Drilling Fluid Plus 14.3 kg/m³ Gypsum

| | Initial | | After Hot Rolling @ 150° F. | |
|---|---|---|---|---|
| Rheology Test Temp., °F. | 75 | 120 | 75 | 120 |
| RPM READINGS | | | | |
| 600 | 251 | 115 | 277 | 110 |
| 300 | 131 | 58 | 146 | 55 |
| 200 | 89 | 39 | 98 | 37 |
| 100 | 45 | 70 | 50 | 19 |
| 6 | 3 | 1 | 3 | 1 |
| 3 | 2 | 1 | 2 | 1 |
| Plastic Viscosity, cp | 120 | 57 | 131 | 55 |
| Yield Point, lb/100 sq ft² | 11 | 1 | 15 | 0 |
| Initial Gel | 2 | 1 | 2 | 1 |
| 10 min. Gel | 2 | 1 | 3 | 1 |
| pH | 11.8 | | 10.5 | |
| $P_f$ | | | 0.4 | |
| $M_f$ | | | 8.0 | |
| Chloride, mg/l | | | 800 | |
| Calcium, mg/l | | | 1200 | |
| Activity | | | 0.80 | |

EXAMPLE 3

An aqueous methyl glucoside solution was prepared containing 69% by weight methyl glucoside and 3.3% by weight potassium hydroxide. API grade Wyoming sodium bentonite was slurried at various concentrations, as indicated in Table 3, in fresh water and mixed with the methyl glucoside solution to give the concentrations of the solution and the slurry set forth in Table 3 (in kg per m³ of the drilling fluid sample). Thereafter there were mixed therewith the concentration of fluid loss reducing additive indicated in Table 3, and the sample drilling fluids were hot rolled at 150° F. for 16 hours. Upon cooling to room temperature, the pH of the samples was adjusted to 9.5–10 with potassium hydroxide, and the API rheological and fluid loss properties obtained. The samples were then heated to 120° F. and the rheological properties were obtained. The data obtained are given in Table 3.

Twenty grams of Pierre Shale having a particle size of 10/20 U.S. Standard Sieve Series (i.e., the particles passed through a 10 mesh (No. 10) screen and were retained on a 20 mesh (No. 20) screen) were added to the drilling fluid Sample D and hot rolled at 150° F. for 16 hours. The drilling fluid was sieved through a 20 mesh screen. 19.4 grams of the Pierre Shale were retained indicating that only 3% of the particles degraded in the drilling fluid. In contrast, when 20 grams of similarly sized Pierre Shale were treated in tap water, only 13.0 grams of the shale were retained indicating that 35% of the particles degraded.

TABLE 3

| Sample Mark | A | B | C | D | E | F | G |
|---|---|---|---|---|---|---|---|
| Methyl Glucoside Solution, kg/m³ | 980.4 | 980.4 | 980.4 | 980.4 | 980.4 | 980.4 | 980.4 |
| Wyoming Bentonite Slurry, kg/m³ | 276.7 | 272.1 | 267.8 | 263.5 | 263.5 | 263.5 | 263.5 |
| (Wyoming Bentonite in Slurry, %) | 4.2 | 3.5 | 2.8 | 2.1 | 2.1 | 2.1 | 2.1 |
| Polyanionic Cellulose[1], kg/m³ | 0 | 0 | 0 | 0 | 2.9 | 0 | 0 |
| Pregelatinized Corn Starch[2], kg/m³ | 0 | 0 | 0 | 0 | 0 | 5.7 | 0 |
| FLOWPLEX, kg/m³ | 0 | 0 | 0 | 0 | 0 | 0 | 5.7 |
| Rheology Test Temp., °F. | 72 | 72 | 72 | 72 | 72 | 72 | 72 |
| RPM Readings | | | | | | | |
| 600 | 235 | 213 | 154 | 143 | 233 | 168 | 202 |
| 300 | 142 | 123 | 91 | 79 | 129 | 91 | 112 |
| 200 | 107 | 89 | 69 | 56 | 91 | 64 | 79 |
| 100 | 66 | 54 | 43 | 37 | 48 | 35 | 44 |
| 6 | 28 | 19 | 19 | 7 | 4 | 4 | 6 |
| 3 | 28 | 19 | 19 | 6 | 2 | 3 | 6 |
| Plastic Viscosity, cp | 93 | 90 | 63 | 64 | 104 | 77 | 90 |
| Yield Point, lb/100 ft.² | 49 | 33 | 28 | 15 | 25 | 14 | 22 |
| Initial Gel | 27 | 19 | 16 | 5 | 2 | 3 | 5 |
| 10 min. Gel | 55 | 43 | 34 | 21 | 3 | 17 | 19 |
| Fluid Loss, cc | 22.0 | 23.5 | 22.2 | 23.6 | 0.2 | 2.5 | 0.3 |
| Rheology Test Temp., °F. | 120 | 120 | 120 | 120 | 120 | 120 | 120 |
| RPM Readings | | | | | | | |
| 600 | 182 | 145 | 116 | 94 | 137 | 104 | 126 |
| 300 | 113 | 90 | 75 | 59 | 75 | 61 | 76 |
| 200 | 89 | 73 | 62 | 47 | 52 | 47 | 59 |
| 100 | 61 | 52 | 45 | 33 | 23 | 30 | 39 |
| 6 | 37 | 30 | 27 | 16 | 3 | 11 | 16 |
| 3 | 37 | 30 | 27 | 16 | 2 | 11 | 16 |
| Plastic Viscosity, cp | 69 | 55 | 41 | 35 | 62 | 43 | 50 |
| Yield Point, lb/100 ft.² | 44 | 35 | 34 | 24 | 13 | 18 | 26 |
| Initial Gel | 37 | 27 | 24 | 15 | 1 | 9 | 12 |

TABLE 3-continued

| Sample Mark | A | B | C | D | E | F | G |
|---|---|---|---|---|---|---|---|
| 10 min. Gel | 61 | 45 | 37 | 25 | 2 | 23 | 28 |

[1] DRISPAC SUPERLO
[2] MY-LO-GEL

EXAMPLE 4

An unweighted drilling fluid was prepared containing 40 kg/m$^3$ pre-hydrated API grade Wyoming bentonite and 592 kg/m$^3$ methyl glucoside in tap water. A drilling fluid weighted to 1619 kg/m$^3$ was prepared containing 40 kg/m$^3$ pre-hydrated API grade Wyoming bentonite, 592 kg/m$^3$ methyl glucoside, and 422.5 kg/m$^3$ barite in tap water. These drilling fluids were evaluated for selected properties using the procedures set forth in API Specification RP 13B. A portion of each drilling fluid was contaminated with either 29.56 kg/m$^3$ sodium chloride, 57.12 kg/m$^3$ Pierre shale, or 14.28 kg/m$^3$ gypsum, and evaluated. The evaluations were conducted on each drilling fluid after aging 16 hours at room temperature, after hot-rolling for 16 hours at 150° F., and after static aging for 15 hours at 325° F. The data obtained are given in Tables 4A–4H.

TABLE 4A

| Unweighted Uncontaminated Drilling Fluid | After Aging @ R.T. | | After Hot Rolling @ 150° F. | | After Static Aging @ 325° F. | |
|---|---|---|---|---|---|---|
| Rheology Test Temp., °F. | 75 | 120 | 75 | 120 | 75 | 120 |
| RPM READINGS | | | | | | |
| 600 | 136 | 116 | 132 | 72 | 82 | 49 |
| 300 | 82 | 86 | 76 | 51 | 45 | 32 |
| 200 | 62 | 76 | 58 | 45 | 33 | 25 |
| 100 | 33 | 63 | 31 | 31 | 20 | 18 |
| 6 | 13 | 43 | 8 | 18 | 6 | 9 |
| 3 | 12 | 43 | 8 | 18 | 5 | 8 |
| Plastic Viscosity, cp | 54 | 30 | 56 | 21 | 37 | 17 |
| Yield Point, lb/100 ft$^2$ | 28 | 56 | 20 | 30 | 8 | 15 |
| Initial Gel | 21 | 50 | 6 | 20 | 8 | 10 |
| 10 min. Gel | 36 | 50 | 16 | 21 | 15 | 20 |
| pH | 10.9 | | 10.3 | | 10.1 | |
| P$_f$ | | | 0.1 | | 0.1 | |
| M$_f$ | | | 16.0 | | 8.0 | |
| Chloride, mg/l | | | 1000 | | 1200 | |
| Calcium, mg/l | | | 160 | | 80 | |
| MBT, lb/bbl equivalent | | | 20 | | | |

TABLE 4B

| Unweighted NaCl Contaminated Drilling Fluid Rheology Test Temp., °F. | After Aging @ R.T. | | After Hot Rolling @ 150° F. | | After Static Aging @ 325° F. | |
|---|---|---|---|---|---|---|
| | 75 | 120 | 75 | 120 | 75 | 120 |
| RPM READINGS | | | | | | |
| 600 | 105 | 69 | 111 | 62 | 94 | 42 |
| 300 | 59 | 46 | 61 | 38 | 53 | 26 |
| 200 | 41 | 39 | 42 | 30 | 37 | 21 |
| 100 | 23 | 28 | 24 | 20 | 21 | 16 |
| 6 | 6 | 18 | 4 | 9 | 6 | 9 |
| 3 | 4 | 16 | 4 | 9 | 4 | 9 |
| Plastic Viscosity, cp | 46 | 23 | 50 | 24 | 41 | 16 |
| Yield Point, lb/100 ft$^2$ | 13 | 23 | 11 | 14 | 12 | 10 |
| Initial Gel | 6 | 25 | 4 | 11 | 8 | 20 |
| 10 min. Gel | 15 | 38 | 7 | 20 | 12 | 22 |
| pH | 10.2 | | 9.4 | | 10.1 | |
| P$_f$ | | | 0.1 | | 0.1 | |
| M$_f$ | | | 12.0 | | 15.0 | |
| Chloride, mg/l | | | 20000 | | 20000 | |
| Calcium, mg/l | | | 160 | | | |

TABLE 4C

| Unweighted Shale Contaminated Drilling Fluid | After Aging @ R.T. | | After Hot Rolling @ 150° F. | | After Static Aging @ 325° F. | |
|---|---|---|---|---|---|---|
| Rheology Test Temp., °F. | 75 | 120 | 75 | 120 | 75 | 120 |
| RPM READINGS | | | | | | |
| 600 | 96 | 99 | 113 | 57 | 98 | 33 |
| 300 | 53 | 68 | 61 | 38 | 52 | 19 |
| 200 | 38 | 55 | 43 | 30 | 32 | 15 |
| 100 | 22 | 42 | 24 | 20 | 18 | 10 |
| 6 | 6 | 22 | 6 | 8 | 3 | 4 |
| 3 | 4 | 20 | 4 | 8 | 3 | 4 |
| Plastic Viscosity, cp | 18 | 37 | 52 | 19 | 46 | 14 |
| Yield Point, lb/100 ft$^2$ | 43 | 31 | 9 | 19 | 6 | 5 |
| Initial Gel | 6 | 28 | 7 | 15 | 3 | 3 |
| 10 min. Gel | 18 | 37 | 10 | 21 | 8 | 6 |
| pH | 10.5 | | 9.6 | | 10.1 | |
| P$_f$ | | | 0.1 | | 0.1 | |
| M$_f$ | | | 14.0 | | 18.0 | |
| Chloride, mg/l | | | 1000 | | 800 | |
| Calcium, mg/l | | | 800 | | | |
| MBT, lb/bbl equivalent | | | 22.5 | | | |

TABLE 4D

| Unweighted Gypsum Contaminated Drilling Fluid | After Aging @ R.T. | | After Hot Rolling @ 150° F. | | After Static Aging @ 325° F. | |
|---|---|---|---|---|---|---|
| Rheology Test Temp., °F. | 75 | 120 | 75 | 120 | 75 | 120 |
| RPM READINGS | | | | | | |
| 600 | 96 | 70 | 92 | 38 | 74 | 49 |
| 300 | 52 | 44 | 51 | 23 | 40 | 31 |
| 200 | 37 | 35 | 35 | 17 | 29 | 24 |
| 100 | 20 | 24 | 19 | 11 | 16 | 17 |
| 6 | 4 | 10 | 4 | 3 | 4 | 11 |
| 3 | 3 | 9 | 3 | 3 | 3 | 11 |
| Plastic Viscosity, cp | 44 | 26 | 41 | 15 | 34 | 18 |
| Yield Point, lb/100 sq ft$^2$ | 8 | 18 | 10 | 8 | 6 | 13 |
| Initial Gel | 5 | 15 | 7 | 9 | 6 | 11 |
| 10 min. Gel | 16 | 16 | 13 | 16 | 36 | 22 |
| pH | 10.5 | | 8.8 | | 10.1 | |
| P$_f$ | | | 0.1 | | 0.1 | |
| M$_f$ | | | 12.0 | | 12.5 | |
| Chloride, mg/l | | | 1000 | | 1600 | |
| Calcium, mg/l | | | 800 | | 600 | |

TABLE 4E

| Weighted Uncontaminated Drilling Fluid | After Aging @ R.T. | | After Hot Rolling @ 150° F. | | After Static Aging @ 325° F. | |
|---|---|---|---|---|---|---|
| Rheology Test Temp., °F. | 75 | 120 | 75 | 120 | 75 | 120 |
| RPM READINGS | | | | | | |
| 600 | 140 | 105 | 165 | 81 | 110 | 48 |
| 300 | 78 | 70 | 91 | 50 | 58 | 26 |
| 200 | 58 | 58 | 64 | 39 | 40 | 19 |
| 100 | 33 | 42 | 36 | 26 | 23 | 11 |
| 6 | 9 | 30 | 7 | 12 | 6 | 4 |
| 3 | 7 | 28 | 6 | 11 | 5 | 3 |
| Plastic Viscosity, cp | 62 | 35 | 74 | 31 | 52 | 22 |
| Yield Point, lb/100 ft$^2$ | 16 | 35 | 17 | 19 | 6 | 4 |
| Initial Gel | 13 | 26 | 10 | 21 | 6 | 5 |
| 10 min. Gel | 30 | 47 | 17 | 30 | 7 | 5 |

TABLE 4E-continued

| Weighted Uncontaminated Drilling Fluid | After Aging @ R.T. | | After Hot Rolling @ 150° F. | | After Static Aging @ 325° F. | |
|---|---|---|---|---|---|---|
| Rheology Test Temp., °F. | 75 | 120 | 75 | 120 | 75 | 120 |
| pH | 10.4 | | 9.6 | | 10.1 | |
| $P_f$ | | | 1.6 | | 0.1 | |
| $M_f$ | | | 16.0 | | 4.0 | |
| Chloride, mg/l | | | 1700 | | 1000 | |
| Calcium, mg/l | | | 280 | | 40 | |
| MBT, lb/bbl equivalent | | | 15 | | | |

TABLE 4F

| Weighted NaCl Contaminated Drilling Fluid Rheology Test Temp., °F. | After Aging @ R.T. | | After Hot Rolling @ 150° F. | | After Static Aging @ 325° F. | |
|---|---|---|---|---|---|---|
| | 75 | 120 | 75 | 120 | 75 | 120 |
| RPM READINGS | | | | | | |
| 600 | 134 | 98 | 143 | 69 | 136 | 77 |
| 300 | 73 | 64 | 78 | 42 | 77 | 48 |
| 200 | 53 | 53 | 55 | 32 | 58 | 40 |
| 100 | 30 | 38 | 30 | 22 | 36 | 29 |
| 6 | 8 | 22 | 6 | 9 | 15 | 20 |
| 3 | 6 | 20 | 5 | 8 | 13 | 18 |
| Plastic Viscosity, cp | 61 | 34 | 65 | 27 | 59 | 29 |
| Yield Point, lb/100 ft$^2$ | 12 | 30 | 13 | 15 | 18 | 19 |
| Initial Gel | 10 | 30 | 10 | 20 | 24 | 25 |
| 10 min. Gel | 23 | 44 | 15 | 28 | 50 | 38 |
| pH | 10.2 | | 9.4 | | 10.1 | |
| $P_f$ | | | 0.8 | | 0.1 | |
| $M_f$ | | | 13.8 | | 17.5 | |
| Chloride, mg/l | | | 16000 | | 17000 | |
| Calcium, mg/l | | | 240 | | 80 | |

TABLE 4G

| Weighted Shale Contaminated Drilling Fluid | After Aging @ R.T. | | After Hot Rolling @ 150° F. | | After Static Aging @ 325° F. | |
|---|---|---|---|---|---|---|
| Rheology Test Temp., °F. | 75 | 120 | 75 | 120 | 75 | 120 |
| RPM READINGS | | | | | | |
| 600 | 142 | 114 | 180 | 84 | 115 | 82 |
| 300 | 80 | 76 | 100 | 53 | 62 | 48 |
| 200 | 58 | 60 | 71 | 41 | 43 | 40 |
| 100 | 34 | 44 | 40 | 30 | 24 | 26 |
| 6 | 8 | 25 | 9 | 14 | 5 | 8 |
| 3 | 6 | 21 | 8 | 14 | 4 | 7 |
| Plastic Viscosity, cp | 62 | 38 | 80 | 31 | 53 | 34 |
| Yield Point, lb/100 ft$^2$ | 18 | 38 | 20 | 22 | 9 | 14 |
| Initial Gel | 15 | 28 | 12 | 25 | 5 | 8 |
| 10 min. Gel | 32 | 42 | 21 | 27 | 26 | 17 |
| pH | 10.3 | | 9.64 | | 10.6 | |
| $P_f$ | | | | | 1.0 | |
| $M_f$ | | | 12.0 | | 9.6 | |
| Chloride, mg/l | | | 1000 | | 1100 | |
| Calcium, mg/l | | | 240 | | 80 | |
| MBT, lb/bbl equivalent | | | 17.5 | | | |

TABLE 4H

| Weighted Gypsum Contaminated Drilling Fluid | After Aging @ R.T. | | After Hot Rolling @ 150° F. | | After Static Aging @ 325° F. | |
|---|---|---|---|---|---|---|
| Rheology Test Temp., °F. | 75 | 120 | 75 | 120 | 75 | 120 |
| RPM READINGS | | | | | | |
| 600 | 133 | 109 | 146 | 64 | 126 | 70 |
| 300 | 73 | 66 | 78 | 37 | 67 | 44 |
| 200 | 51 | 50 | 54 | 27 | 45 | 35 |
| 100 | 29 | 34 | 29 | 17 | 25 | 25 |
| 6 | 6 | 15 | 5 | 6 | 5 | 12 |
| 3 | 5 | 13 | 4 | 6 | 4 | 10 |
| Plastic Viscosity, cp | 60 | 43 | 68 | 27 | 59 | 26 |
| Yield Point, lb/100 ft$^2$ | 13 | 23 | 10 | 10 | 12 | 18 |
| Initial Gel | 10 | 25 | 9 | 15 | 6 | 12 |
| 10 min. Gel | 25 | 30 | 18 | 27 | 17 | 36 |
| pH | 10.2 | | 8.7 | | 10.8 | |
| $P_f$ | | | | | 1.2 | |
| $M_f$ | | | 16.0 | | 10.0 | |
| Chloride, mg/l | | | 800 | | 1100 | |
| Calcium, mg/l | | | 480 | | 320 | |

What is claimed is:

1. In a drilling fluid comprising an aqueous phase having incorporated therein one or more functional materials selected from the group consisting of weighting agents and fluid loss reducing additives, the improvement wherein the aqueous phase has an alkyl glucoside solublized therein, wherein said alkyl radical contains from one to four carbon atoms.

2. In a drilling fluid comprising an aqueous phase having incorporated therein one or more functional materials selected from the group consisting of weighting agents, viscosifiers, fluid loss reducing additives, rheological modifying additives, emulsifiers, and seepage loss control additives, the improvement wherein the aqueous phase has from about 35% to about 65% by weight of the aqueous phase of an alkyl glucoside solublized therein, wherein said alkyl radical contains from one to four carbon atoms.

3. The drilling fluid of claim 2 containing from about 45% to about 60% by weight of the aqueous phase of the alkyl glucoside.

4. The drilling fluid of claim 1, 2, or 3 wherein the alkyl glucoside is methyl glucoside.

5. The drilling fluid of claim 1, 2, or 3 wherein the alkyl glucoside is methyl glucoside, and wherein the drilling fluid has a pH in the range from about 8.5 to about 12.

6. In a water base drilling fluid comprising an aqueous phase having incorporated therein one or more functional materials, to provide the drilling fluid with certain desired characteristics, selected from the group consisting of weighting agents and fluid loss reducing additives, the improvement wherein the aqueous phase has an alkyl glucoside dissolved therein in an amount sufficient to decrease the swelling of shale contacted by the drilling fluid, wherein said alkyl radical contains from one to four carbon atoms.

7. The drilling fluid of claim 6 wherein the alkyl glucoside is methyl glucoside.

8. The drilling fluid of claim 7 wherein the concentration of methyl glucoside in at least about 35% by weight of the aqueous phase.

9. The drilling fluid of claim 7 or 8 wherein the methyl glucoside comprises from about 45% to about 55% methyl α-D-glucoside and from about 45% to about 55% methyl β-D-glucoside.

10. The method of decreasing the swelling of shale in contact with a water base drilling fluid, the drilling fluid having incorporated therein one or more functional materials selected from the group consisting of weighting agents, viscosifiers, fluid loss reducing additives, rheological modifying additives, emulsifiers, and seepage loss control additives, which comprises adding to the drilling fluid a water soluble alkyl glucoside in an amount sufficient to accomplish such decrease, wherein said alkyl radical contains from one to four carbon atoms.

11. The method of claim 10 wherein the alkyl glucoside is methyl glucoside.

12. The method of claim 11 wherein the concentration of methyl glucoside is at least about 35% by weight of the aqueous phase.

13. The method of claim 11 or 12 wherein the methyl glucoside comprises from about 45% to about 55% methyl $\alpha$-D-glucoside and from about 45% to about 55% methyl $\beta$-D-glucoside.

* * * * *